United States Patent [19]

Lutz, II

[11] Patent Number: 5,026,096

[45] Date of Patent: Jun. 25, 1991

[54] AXIAL FORCE RESISTING PIPE COUPLING

[75] Inventor: Milton F. Lutz, II, Jackson, Mich.

[73] Assignee: Midbrook Products, Inc., Jackson, Mich.

[21] Appl. No.: 494,427

[22] Filed: Mar. 16, 1990

[51] Int. Cl.⁵ .............................................. F16L 13/04
[52] U.S. Cl. .................................... 285/114; 285/373; 285/424
[58] Field of Search ............... 285/419, 114, 903, 373, 285/423, 424

[56] References Cited

U.S. PATENT DOCUMENTS

| | | | |
|---|---|---|---|
| 1,049,543 | 1/1913 | Smith | 285/903 X |
| 3,239,254 | 3/1966 | Campbell | 285/903 X |
| 3,782,763 | 1/1974 | Henrickson | 285/903 X |
| 3,905,623 | 9/1975 | Cassel | 285/417 X |
| 4,502,189 | 3/1985 | Sieberkrob et al. | 285/373 X |

Primary Examiner—Dave W. Arola
Assistant Examiner—Heather Chun
Attorney, Agent, or Firm—Beaman & Beaman

[57] ABSTRACT

An axial force resisting pipe coupling for coupling pipes in aligned end-to-end relation. The coupling is of a simplified, economical construction comprising a plurality of axially aligned spaced clamps, including a central clamp and two outrigger clamps, attached to a common bar, and the coupling may be formed by retrofitting an existing central clamp with the outrigger clamps and bar. Each of the clamps consist of a generally circular band terminating in opposed connecting end flanges and are attached to the bar at the flanges by fasteners which also facilitate circumferential contraction and expansion of the clamps. Projections may be formed on the bands for embedding into the pipe members to minimize the likelihood of the pipes pulling apart due to high tension forces.

5 Claims, 1 Drawing Sheet

AXIAL FORCE RESISTING PIPE COUPLING

BACKGROUND OF THE INVENTION

Pipe couplings using circumferential bands are commonly employed in connecting aligned end-to-end pipes as shown in U.S. Pat. No. 4,473,246. However, such couplings do not provide high resistance to significant tension forces in the pipes, and it is known to resist high tension forces with this type of coupling by using outrigger clamps in conjunction with a central clamp as shown in U.S. Pat. No. 4,502,189. Such clamps comprise a generally circular band portion terminating in opposed connecting end flanges, and the outrigger clamps are attached to the central clamp by strap elements. Fasteners in the form of a nut and bolt are passed through the opposed connecting flanges and are tightened to draw the connecting flanges toward each other.

Although the aforementioned pipe couplings have proven to be dependable they have a relatively complicated and expensive construction or require a relatively large number of parts which makes for a time consuming assembly process and adds to the overall cost of the product. Also, the outrigger type clamp requires a specific configuration and cannot be modified to a non-outrigger type if the extra resistance to tension forces is not required.

An object of the invention is to provide an axial force resisting pipe coupling having outrigger clamps wherein the pipe coupling requires a small number of components, is of a simple construction, economical to manufacture, and simple and efficient to use.

A further object of the invention is to provide an axial force resisting pipe coupling having a central clamp and a pair of outrigger clamps wherein the outrigger clamps can be retrofitted to a conventional circumferential clamp and the invention permits a variety of clamp configurations to be assembled from a minimum number of inventoried parts.

Another object of the invention is to provide an axial force resisting pipe coupling having outrigger clamps wherein the outrigger clamps are provided with projections for embedding into the pipe members to increase the axial force resistance of the coupling.

An axial force resisting pipe coupling in accord with the invention consist of a central clamp and two axially spaced outrigger clamps. Each of the clamps are attached to a common outrigger bar and are fabricated by forming a piece of sheet metal into a generally circular configuration defining a circular band portion terminating in opposed connecting end flanges directed radially outwardly from the band. The flanges are rolled back defining loops which receive reinforcing bars and are provided with apertures which align with apertures defined in the outrigger bar. Each of the aligned apertures receive a carriage bolt on which a nut is threaded to mount the clamps to the outrigger bar and the same nut and bolt also facilitate circumferential contraction and expansion of the clamps.

In a typical application the central clamp overlaps the aligned ends of the pipe members to be joined while each of the outrigger clamps circumscribes one of the pipe members at an axially spaced distance from the central clamp. Tightening of the nuts and bolts is effective to draw the opposed flanges toward each other and thereby impart circumferential tension to the clamps sufficient to maintain the pipes together. If desired, the outrigger clamps may be fashioned with projections or dimples for embedding into the pipes to increase the friction of the outrigger clamps and minimize the likelihood of the pipes separating due to high tension forces.

If a leak resistant joint is specified, sleeve elements may be disposed within the central clamp to impart a leak resistant characteristic to the joint. These sleeve elements may include a metal sleeve disposed within the central clamp, and an elastomeric sleeve disposed within the metal sleeve. Each of the sleeves overlap the ends of the pipes and are tightened to the pipes simultaneously with the drawing together of the opposed flanges. The metal sleeve tightens the elastomeric sleeve to the pipe ends which provides leak resistance for the joint.

As the bar connecting the outrigger clamps to the central clamp is attached to the central clamp by its constricting fasteners, and the bar is likewise attached to the outrigger clamps, the bar and outrigger clamps may be easily retrofitted to existing central clamps and the practice of the invention minimizes inventories and provides a versatility of clamp availability not previously available.

The fact that the outrigger clamps and central clamps are attached to a common bar by fastening means which are also utilized to facilitate circumferential contraction and expansion of the clamps provides a coupling of a simple, economical construction which is readily assembled, convenient to install and capable of resisting high tension forces.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
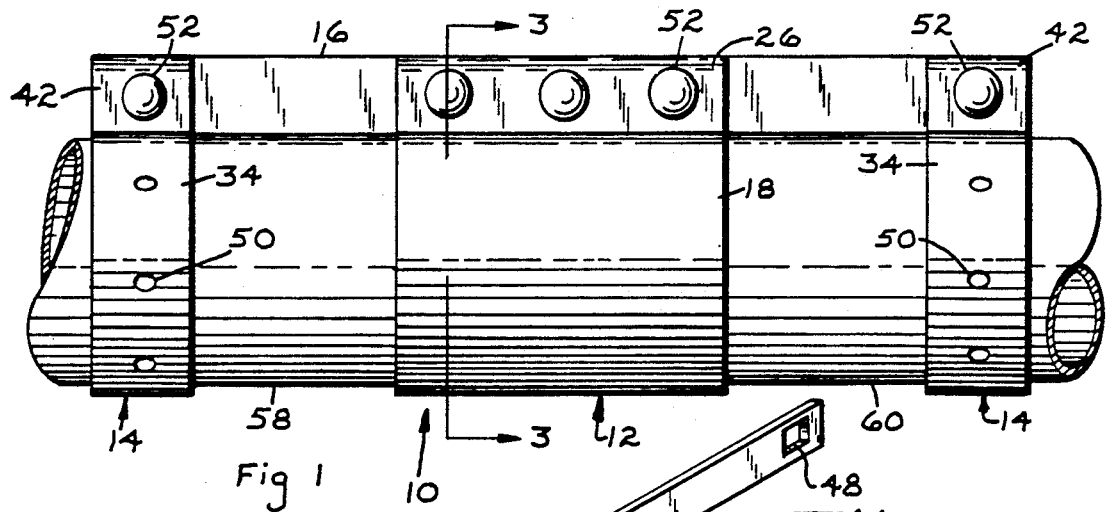
FIG. 1 is an elevational view of a pipe coupling constructed in accord with the inventive concepts illustrated in a typical application connecting two pipe members in end-to-end relation.
Figure 2:
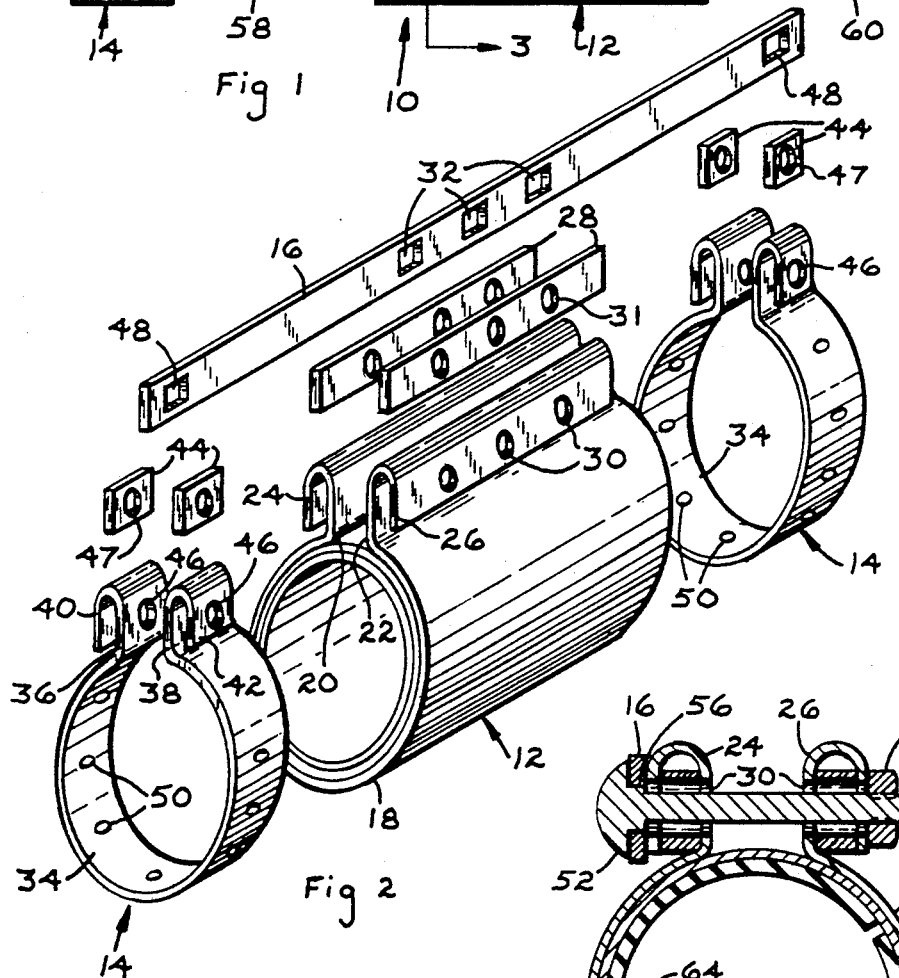
FIG. 2 is an exploded perspective view of the pipe coupling of FIG. 1.
Figure 3:
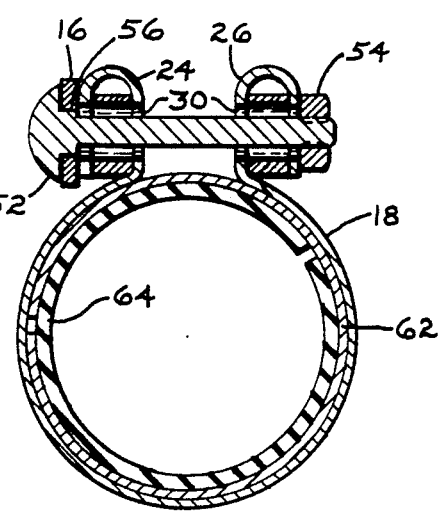
FIG. 3 is an elevational, sectional, view as taken along Section 3—3 of FIG. 1.

A typical axial force resisting pipe coupling in accord with the invention is disclosed in FIGS. 1–3. The coupling 10, which is well suited in situations where two pipe members are to be connected in end-to-end relation, comprises a plurality of axially aligned circumferentially contractible band clamps including a central clamp 12 and a pair of outrigger clamps 14. The clamps 12 and 14 are connected to a common outrigger strap or bar 16 by fastening means, and the fastening means are also utilized to facilitate circumferential contraction and expansion of the bands. The coupling 10 is particularly suited for applications where the coupled pipes may be subjected to internal pressure surges or blockage whereby the outrigger clamps 14 minimize the likelihood of the pipes pulling apart.

The clamp 12 is economically fabricated by bending a rectangular piece of sheet metal, preferably aluminum, into a generally circular body 18 extending slightly less than a full 360° terminating in opposed flanges 20 and 22 directed radially outwardly from the body 18. The flanges 20 and 22 are coextensive in axial length with the body 18 and are rolled back defining loops 24 and 26, respectively, and each loop receives a reinforcing bar 28. Oblong apertures 30 and 31 provided at desired locations along the flanges 20 and 22 and reinforcing bars 28, respectively, align with square shaped apertures 32 defined in the outrigger bar 16 to receive fastening means to mount the clamp 12 to the bar.

The outrigger clamps 14 are identical and are fabricated in the same manner as the central clamp 12 and consist of a generally circular body 34 having opposed flanges 36 and 38. The flanges 36 and 38 are coextensive in axial length with the body 34 and are rolled back defining loops 40 and 42, respectively, and each loop receives a reinforcing bar 44. Oblong shaped apertures 46 and 47 defined in the flanges 36 and 38 and reinforcing bars 44, respectively, align with apertures 48 defined at each end of the bar 16 to receive fastening means to mount the clamps 14 to the bar. The outrigger clamps 14 may be provided with inwardly extending projections or dimples generally indicated at 50 for embedding into the associated pipes to increase the friction grip of the clamps, and the projections 50 may be formed in a number of ways. For instance, the projections 50 might be formed by simply drilling holes inwardly through the body 34 to produce burrs on the interior of the clamps, or they might be "stamped" in the body 34 with a punch.

To fasten the clamps 12 and 14 to the bar 16, one flange of each of the clamps is positioned along one side of the bar aligning the respective apertures and a carriage bolt 52 and nut 54 are used at each of the fastening locations. For example, in FIG. 3 the sectional view taken through the central clamp 12 illustrates how each of the clamps are mounted to the bar 16 whereby the bolt 52 includes a square neck 56 which forms a non-rotatable fit with the squared and oblong apertures and the shank of the bolt passes through the flanges 24 and 26 to mate with the nut 54. The precise fit of the bolt neck 56 with the apertures prevents the bolt 52 from turning when tightening the nut 54 with a tool, such as a wrench.

In a typical installation the coupling 10 is adapted to join the pipe members 58 and 60 together, as shown in FIG. 1. The coupling 10 is positioned over the abutting ends of the pipe members 58 and 60 so that the central clamp 12 overlaps the ends of both pipes while one of the outrigger clamps 14 circumscribes pipe 58 and the other outrigger clamp circumscribes pipe 60. Tightening of the nuts 54 draws the respective opposing flanges toward each other circumferentially tensioning each of the clamps about the pipe members and thereby producing substantial frictional forces between the clamps and pipe members to prevent the pipes 58 and 60 from separating.

It may be desired that the coupling be used where a leak resistant coupling joint is required. For this purpose the coupling may be used in conjunction with contractible sleeve elements to join the two pipe sections together. The sleeve elements comprise a contractible metal sleeve 62 disposed within the central coupling body 18, and a elastomeric sleeve 64 disposed within the metal sleeve as shown in FIG. 3. The sleeves 62 and 64 overlap the ends of the pipe members and when the coupling 10 is tightened the metal sleeve 62 compresses the elastomeric sleeve 64 about the pipe ends to provide a leak resistant seal.

The coupling 10 may be fabricated for a number of pipe sizes, and the axial length of the outrigger clamps 14 and central clamp 12 may vary, however, the outrigger clamps are typically about one third the length of the central clamp. The number of fasteners that will be used with each of the clamps will depend on the length of the clamp. The simple construction of the coupling 10 provides a coupling which is readily manufactured at low cost and is quickly and conveniently installed without a complicated installation procedure, yet is dependable under high tension forces.

The central clamp 12 is often used by itself in many applications where high tensile resistance is not required and an important advantage of the disclosed application is the fact that the clamps 14 and 16 can be retrofit mounted to a clamp 12 without modification thereto. This versatility of assembly reduces inventory requirements.

It is to be appreciated that various modifications to the inventive concepts may be apparent to those skilled in the art without departing from the spirit and scope of the invention.

What is claimed is:

1. An axial force resisting pipe coupling for connecting pipes in aligned end-to-end relation characterized by its economical construction and ability to resist high tension forces comprising, in combination, an elongated separate strap, a plurality of circumferentially contractible band clamps, each of said clamps having a generally circular configuration defining a band portion terminating in opposed end flanges, fastening means associated with each of said clamps connecting said clamps to said strap in axially aligned relation with respect to one another and adapted to draw said opposed flanges toward and away from each other contracting and expanding said bands, respectively, said plurality of clamps including two outer clamps and a central clamp, radially contractible sleeve elements disposed within said central clamp band portion, said sleeve elements including a metal sleeve and a elastomeric sleeve disposed within said metal sleeve, said elastomeric sleeve overlapping the associated pipe ends and circumferentially contracted upon tightening of said fastening means.

2. In an axial force resisting pipe coupling as in claim 1, a plurality of inwardly extending projections defined on said outer clamps adapted to embed into the outer surface of the associated encircled pipe.

3. An outrigger attachment assembly adapted to be retrofitted to at least two existing clamps for connecting pipes in aligned end-to-end relation wherein the clamps each comprise a contractible band having ends, said band ends having formed radially extending flanges having bent over spaced loops having outer surfaces, the improvement comprising, a reinforcing spacer bar located within each band end intermediate the associated flange and loop to maintain the spacing therebetween, aligned holes defined in the flanges, loops and said bars, an outrigger bar engaging the outer surface of one of the loops of each clamp, bolt receiving holes defined in said outrigger bar in alignment with said aligned holes in the flanges, loops and said reinforcing bars, and a bolt received within said aligned holes whereby tightening of said bolt contracts the associated band and fixes the outrigger bar to the associated band loop outer surface, said outrigger bar determining and maintaining the spacing between the associated clamps.

4. In an outrigger attachment assembly as in claim 3, a plurality of inwardly extending projections defined on at least one clamp band adapted to embed into the outer surface of the associated encircled pipe.

5. In an outrigger attachment as in claim 3, said holes defined in the flanges, loops and said reinforcing spacer bars being of an oblong configuration.

* * * * *